United States Patent [19]
Herbert

[11] 3,738,439
[45] June 12, 1973

[54] SCALE TESTER

[76] Inventor: Arthur J. Herbert, 45, 45th Avenue, Edmundston, New Brunswick, Canada

[22] Filed: Mar. 8, 1972

[21] Appl. No.: 232,875

[30] Foreign Application Priority Data
Jan. 6, 1972 Canada.............................. 131,821

[52] U.S. Cl. .................................................. 177/50
[51] Int. Cl........................................... G01g 19/52
[58] Field of Search .................... 177/50, 176, 252; 73/1 B

[56] References Cited
UNITED STATES PATENTS
R27,263 12/1971 Garnett............................ 177/50 X Primary Examiner—George H. Miller, Jr.
Attorney—Stanley E. Johnson

[57] ABSTRACT

A platform scale is provided with a scale testing mechanism of the dead-weight type for determining the accuracy of the scale. The testing mechanism comprises a plurality of hangers fixed to the underside of the scale platform, a calibrated weight suspended from the hangers, and a lifting mechanism comprising a plurality of bell crank lever driven by jack screws in response to actuation of a reversible electric motor selectively to raise the calibrated weight out of supported engagement with the hangers or to lower the calibrated weight into engagement with the hangers.

9 Claims, 6 Drawing Figures

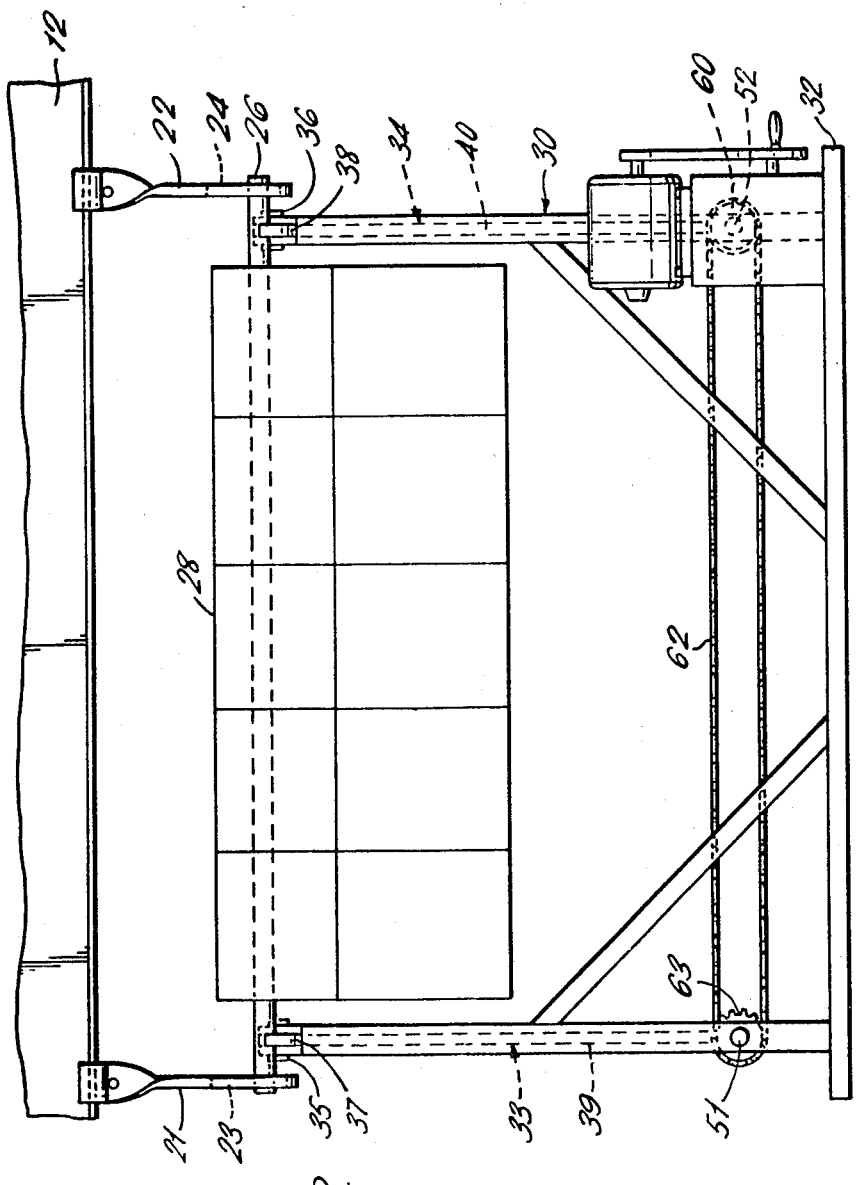

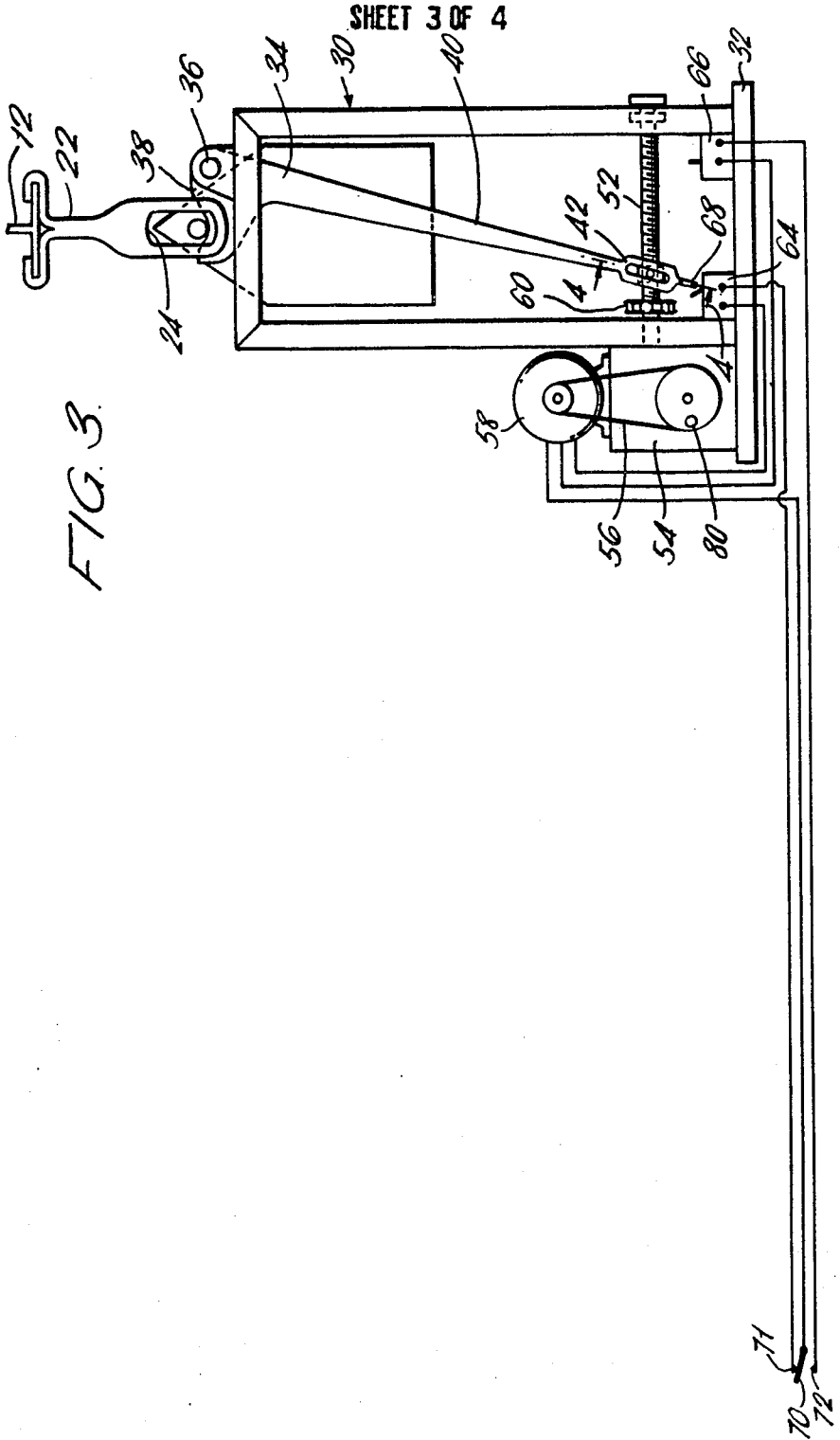

SCALE TESTER

The present invention relates to scale testing mechanisms and more particularly to mechanism for determining the accuracy of platform scales.

DESCRIPTION OF THE PRIOR ART

In one type of previously known scale testing mechanisms, there is provided a base member supported on the upper side of a scale platform and acting as a fulcrum for a balance beam. The balance beam has one short arm pivotally connected to the ground or the scale base and a long arm from which a calibrated weight is suspended at any selected distance from the fulcrum. The arrangement is such that the force exerted on the scale platform is greater than the actual weight of the calibrated weight suspended from the balance beam. Such devices are portable and must be installed and removed after every use. The test results obtained with the use of such an apparatus are subject to the accuracy of the testing device itself. One such testing device is disclosed in Canadian patent No. 149,732, issued Aug. 5, 1913 to one Samuel M. Boling.

In another form of scale testing device, there is provided a balance scale having its base resting on the scale platform. A hydraulic cylinder is connected at opposite ends thereof to the scale base and to a beam of the balance scale to exert a downward force on the balance scale and, through its base, on the scale platform. With an arrangement of this nature, the test is essentially a comparison of the calibration of the platform scale with the calibration of the balance scale and therefore is highly dependent on the accuracy of the balance scale. One such testing device is disclosed in U.S. Pat. No. 1,746,351, issued Feb. 11, 1930 to one A. O. Hem.

Also known in the prior art are devices known as dead-weight testers which are used to subject various devices to the effects of stationary weights to enable calibration of the devices. These testers generally comprise a plurality of superimposed calibrated weights and some mechanism for raising the weights either serially or as a unit. The weights rest on some support structure and are raised off the structure by engagement with the weights of a hanger which is itself supported either directly or indirectly on the device to be tested. The arrangement, therefore, is such that the device to be tested must be raised with the hangers when the hangers themselves raise to pick up the calibrated weights. Such an arrangement would be difficult, if not impossible, to use for testing a platform scale since the platforms thereof are not permitted to move to a great extent. A dead-weight tester of this type is disclosed in U.S. Pat. No. 2,925,728, issued Feb. 23, 1960 to one D. H. MacDonald.

DEFINITION OF THE INVENTION

Accordingly, it is an object of the present invention to provide a tester of the dead-weight type for use with platform scales.

In accordance with the present invention, there is provided a scale having a platform, scale means connected to the platform for indicating the weight of an object supported by the platform, and a dead-weight tester for the platform scale. The tester comprises a calibrated weight, a first supporting means for supporting the calibrated weight from the scale platform, a second supporting means movable between two limiting positions to move the calibrated weight into and out of supported engagement with the first supporting means, and means for selectively moving the second supporting means between the limiting positions.

DESCRIPTION OF THE DRAWINGS

The present invention will now be described, by way of example, with reference to the accompanying drawings in which:

FIG. 2 is a front elevation of a scale tester in accordance with the present invention;

FIG. 3 is a side elevation of the scale tester of FIG. 2;

DESCRIPTION OF THE ILLUSTRATED EMBODIMENTS

Figure 1:
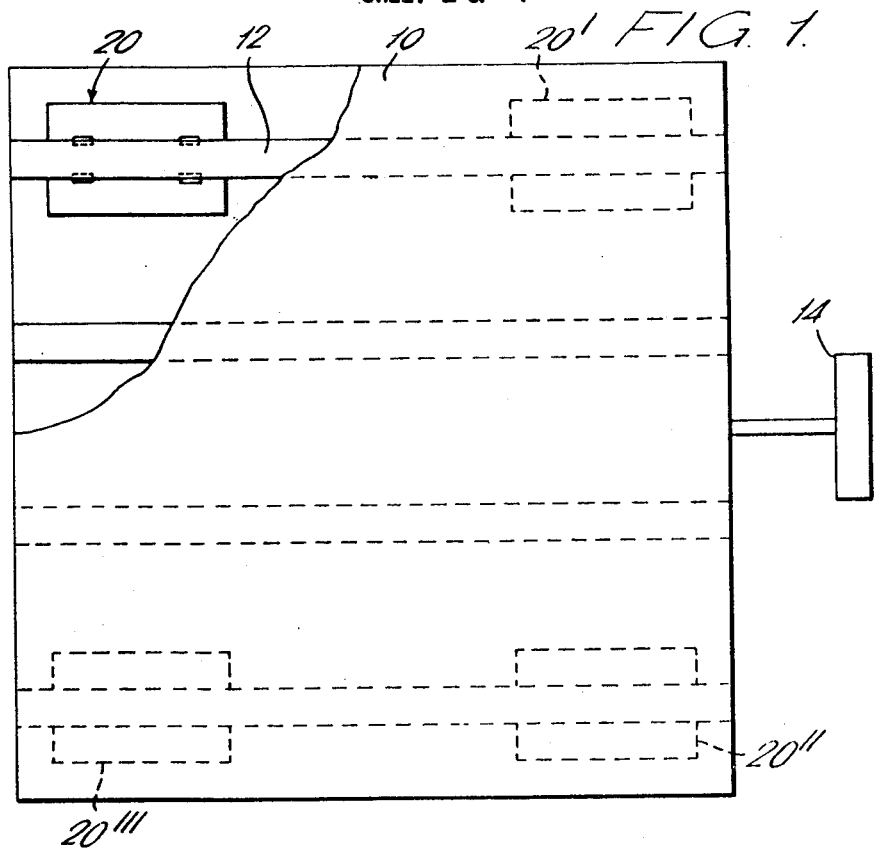
FIG. 1 is a schematic plan view of a platform scale including a scale testing mechanism in accordance with the present invention.

Referring most particularly to FIG. 1, there is shown a platform scale having a platform 10 supported on a plurality of beams, one of which is shown at 12, and a scale 14 connected by any known beam arrangement (not shown) to platform 10 to indicate the weight of any object placed thereon. In accordance with the objects of the present invention, there is provided, beneath the scale platform 10, a scale tester as indicated generally by the reference numeral 20.

Figure 4:
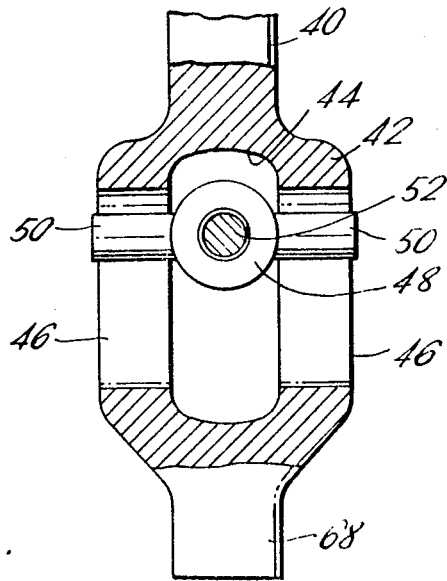
FIG. 4 is a view along section line 4—4 of FIG. 3.

A scale tester in accordance with the present invention will now be described with reference to FIGS. 2, 3 and 4.

Two hangers 21 and 22 are rigidly connected at the upper ends thereof to a beam 12. The lower ends of hangers 21 and 22 are substantially flat in configuration, disposed parallel to one another and are provided with elongated, vertically extending slots 23 and 24, respectively.

The respective opposite ends of a horizontally extending bar 26 extend through the slots 23 and 24 of hangers 21 and 22, respectively, for free vertical movement therewithin. A calibrated weight 28 extends longitudinally of bar 26 and is fixed thereto for movement therewith. The opposite ends of calibrated weight 28 are spaced from the respective hangers 21 and 22.

Disposed beneath the arrangement thus far described is a frame 30 of substantially rectangular configuration and having a base 32 supported on the ground. Two bell crank levers 33 and 34 are pivotally connected to frame 30 at 35 and 36, respectively. Pivotal connections 35 and 36 extend substantially parallel to bar 26 whereby bell cranks 33 and 34 are pivotable in respective parallel, spaced planes substantially perpendicular to bar 26. An arm 37 of bell crank 33 extends beneath bar 26 intermediate hanger 21 and the end of calibrated weight 28, and, similarly, an arm 38 of bell crank 34 extends beneath bar 26 intermediate hanger 22 and the respective opposite end of calibrated weight 28. Bell cranks 33 and 34 have arms 39 and 40, respectively, of substantially greater length than the length of arms 37 and 38. Arms 39 and 40 extend substantially downwardly from pivots 35 and 36, respectively, and have enlarged lower end portions, as shown by reference numeral 42 in FIGS. 3 and 4, with respect to crank 34. The enlarged lower end portions of cranks 33 and 34 each have elongated slots therein, the slots extending substantially longitudinally of arms 39 and 40, respectively, and extending therethrough in directions parallel to the respective planes of rotation thereof. The enlarged lower ends of arms 39 and 40 are also provided with slots 46 intersecting slots 44 and extending substantially perpendicular thereto. An internally threaded nut 48 is disposed within slot 44 in bell crank 34 and is provided with two outwardly extending rod-like members 50 which extend outwardly through slot 46 on opposite sides of nut 48. A similar arrangement is provided at the lower end of bell crank 33 (not shown).

Nut 48 is threadably engaged with a horizontally extending jack screw 52 which is journalled to frame 30 for rotation with respect thereto. The longitudinal axis of jack screw 52 extends essentially in the plane of rotation of bell crank 34. Similarly, bell crank 33 is engaged with a jack screw 51.

One end of jack screw 52 is connected in driven relationship with the output of a rear-type speed reducing unit 54. Reducing unit 54 is driven, via a belt drive 56, by a reversible electric motor 58. A chain sprocket 60 is fixed to one end of jack screw 52 for rotation therewith to drive a chain 62 extending about sprocket 60 and a similar chain sprocket 63 fixed to jack screw 51.

At 64 and 66 are shown two limit switches fixed to frame 30 beneath jack screw 52. Limit switches 64 and 66 are arranged to be actuated by engagement therewith of a lug 68 depending from arm 40 of bell crank 34.

Two electric circuits are provided for driving motor 58 in respective opposite directions and a double throw switch 70 is arranged to selectively actuate either circuit. Limit switches 64 and 66 are disposed in respective ones of the two electric circuits to open the circuits in response to actuation of the switches by lug 68.

With the tester in the position shown in FIG. 3, bell cranks 33 and 34 are supporting bar 26 out of engagement with hangers 21 and 22. When switch 70 is closed with contact 72, the electric circuit including limit switch 66 is energized to drive motor 58 in a predetermined direction. The arrangement is such that motor 58 will drive jack screw 52 through gear reduction unit 54, and thus jack screw 51 through its chain coupling with jack screw 52, to pivot bell cranks 33 and 34 such that their respective arms 37 and 38 will lower bar 26 into supported engagement with hangers 21 and 22. When bell cranks 33 and 34 have been pivoted sufficiently far that they no longer engage bar 26, lug 68 on bell crank 34 actuates limit switch 66 to open this switch and thus stop motor 58.

In order to return the tester to the position shown in FIG. 3, switch 70 is closed with contact 71 and the electric circuit including limit switch 63 is energized to drive the motor and thus the jack screws in the reverse direction of what has been described. This results in an opposite pivotal movement of bell cranks 33 and 34 and the lifting of bar 26 out of engagement with hangers 21 and 22 by the action of arms 37 and 38 of bell cranks 33 and 34, respectively. Limit switch 64 acts to cut off power to motor 58 when bell cranks 33 and 34 have reached the end of their travel.

Figure 5:
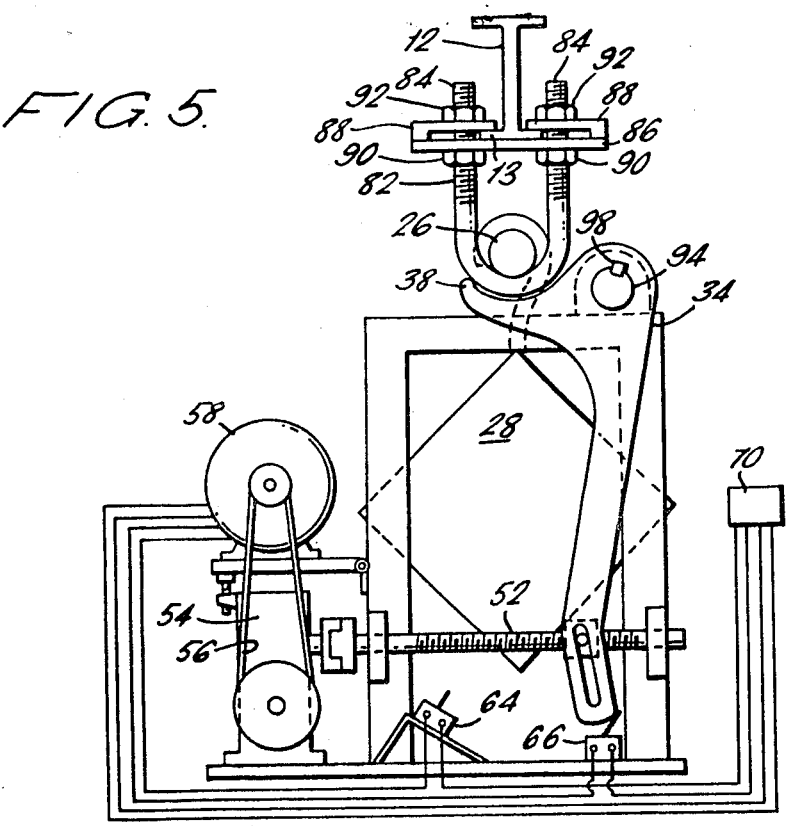
FIG. 5 is a side elevation of an alternative form of tester.
Figure 6:
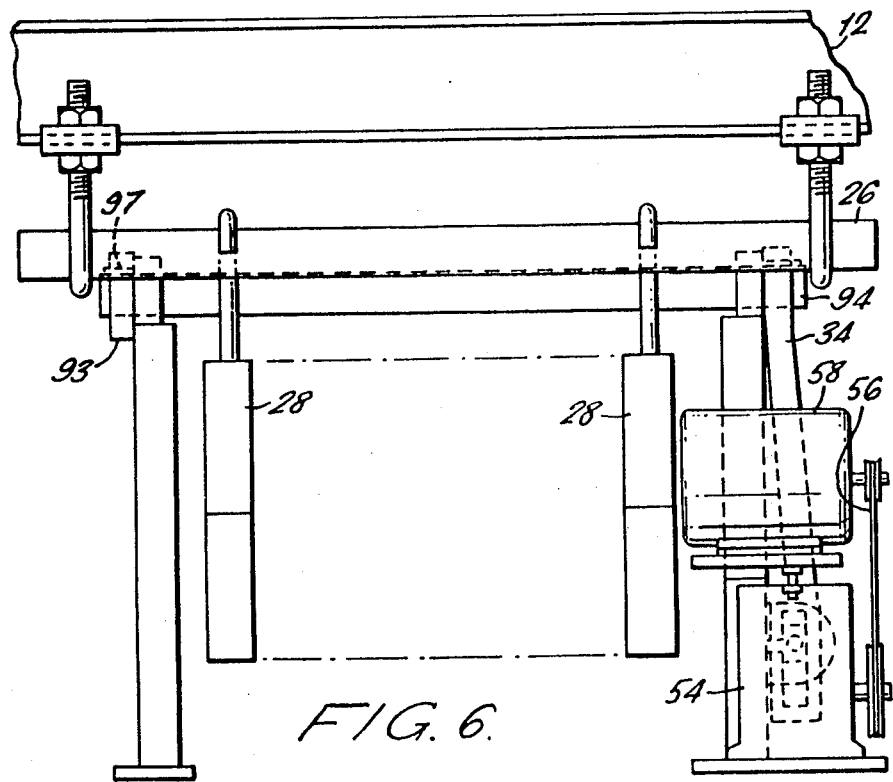
FIG. 6 is a front elevation of the tester of FIG. 5.

In the embodiment of the present invention shown in FIGS. 5 and 6, jack screw 51, chain sprockets 60 and 63, and chain 62 have been eliminated and bell crank 33 has been replaced by a lever 93. A shaft 94 extends between lever 93 and bell crank 34 and is keyed to each at the pivot points thereof, as by keys 97 and 98 respectively.

As can be most clearly seen in FIG. 5, each of hangers 21 and 22 has been replaced by an adjustable hanger, comprising a U-bolt 82 having two threaded arms 84. A lower clamping plate 86 extends between, and slidably engages with, arms 84 of the U-bolt 82 so as to be slidable therealong. Two upper clamping plates 88 are each slidably mounted on a respective one of the two U-bolt arms 84 and a pair of nuts 90 and 92 are threaded onto each of arms 84, with clamping plates 86 and 88 between the two nuts.

As shown in FIG. 5, the lower flange 13 of beam 12 is clamped between the upper clamping plates 88 and the lower clamping plate 86 by a force exerted by the nuts 90 and 92. This arrangement provides for vertical adjustment of the U-bolts 82 with respect to beam 12.

In use, shaft 26 extends through the U-bolts for engagement therewith in a manner similar to the previously described engagement of shaft 26 with slots 23 and 24 in hangers 21 and 22 respectively.

The embodiment of FIGS. 5 and 6 also incorporates a different type of weight arrangement. In this embodiment a plurality of calibrated weights 28 are individually suspended from shaft 26 by hooks, thus facilitating the installation and removal of any desired number of such weights.

In a further embodiment of the present invention, manual actuation of the raising and lowering mechanism is provided for as, for example, by crank handle 80 on the input to gear reduction unit 54, as seen in FIG. 3. Such an arrangement could be provided as an auxiliary drive in the case of power failure or as the only drive mechanism provided in the event that no electric power is available (in which case motor 58 will not be included).

It is also envisaged to provide a plurality of scale testers in accordance with the present invention on a single scale platform, for example, at the corners thereof, as shown at 20', 20'' and 20''' in FIG. 1, and as is well-known in the art to ascertain the response of the scale to loads at various points on the platform.

I claim:

1. Apparatus for testing a scale of the type which includes a platform and a weight indicating means connected to said platform which is responsive to a weight supported by said platform, said testing apparatus comprising:
   a. a first support means having means thereon connecting the same to said platform so as to be supported by said platform;
   b. a calibrated weight supported by said first support means in a testing position;
   c. a base;
   d. a second support means mounted on said base; and
   e. means selectively moving said second support means into and out of supporting engagement with said calibrated weight selectively to move said calibrated weight into and out of supported relation with said first support means whereby when said calibrated weight is supported by said first support means and thereby said platform, said weight indicating means are responsive to said calibrated weight.

2. An apparatus as claimed in claim 1 wherein said first support means comprise a plurality of hangers connected to said platform and depending therefrom.

3. An apparatus as claimed in claim 1 wherein said calibrated weight comprises an elongated bar and at least one weight member connected to said bar intermediate the respective opposite ends thereof and for movement therewith, the respective opposite ends of said bar being engageable with said first support means and said second support means.

4. An apparatus as claimed in claim 1 wherein said base comprises a frame disposed beneath said platform independently thereof, said second support means being connected to said frame for movement with respect thereto.

5. An apparatus as claimed in claim 4 wherein said second support means comprise a plurality of levers pivotally connected to said frame and means interconnecting said levers for simultaneous movement thereof.

6. Apparatus for testing a scale of the type which includes a platform and weight indicating means connected to said platform which is responsive to a weight supported by said platform, said testing apparatus comprising:
   a. first support means having means thereon connecting the same to said platform;
   b. a calibrated weight supported by said first support means in a testing position;
   c. a base comprising a frame disposed beneath said platform independently thereof;
   d. a second support means comprising a plurality of levers pivotally connected to said frame and means interconnecting said levers for simultaneous movement thereof; and
   e. at least one jack screw journalled to said frame and threadably interconnected with at least one of said levers for selectively moving said levers into and out of supporting engagement with said calibrated weight selectively to move said calibrated weight into and out of supported relation with said first support means.

7. An apparatus as claimed in claim 6 wherein said first support means comprise a plurality of hangers mounted on said platform and depending therefrom, each said hanger being adjustably mounted on said platform to permit selective adjustment of said testing position.

8. An apparatus as claimed in claim 6 wherein said means for moving said second support means further comprise a reversible electric motor connected to said at least one jack screw in driving relationship therewith.

9. An apparatus as claimed in claim 8 and including two electric circuits selectively and alternatively actuating said reversible electric motor for movement thereof in opposite directions, two limit switches, each interposed in a respective one of said electric circuits, each said limit switch opening the respective one of said electric circuits in response to engagement with said limit switch of one of said levers when said one of said levers is in a respective one of two limiting positions.

* * * * *